United States Patent Office 3,412,540
Patented Nov. 26, 1968

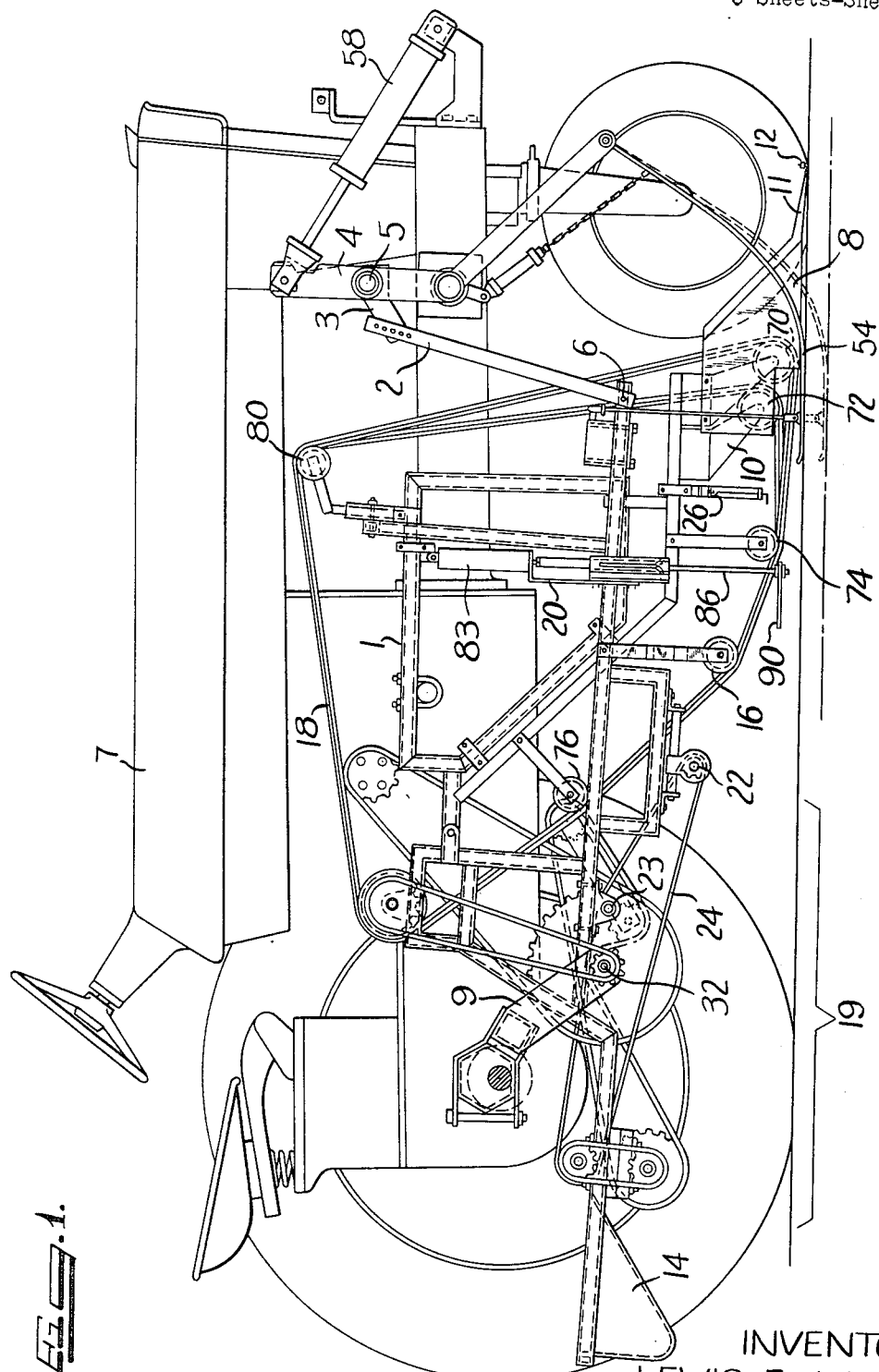

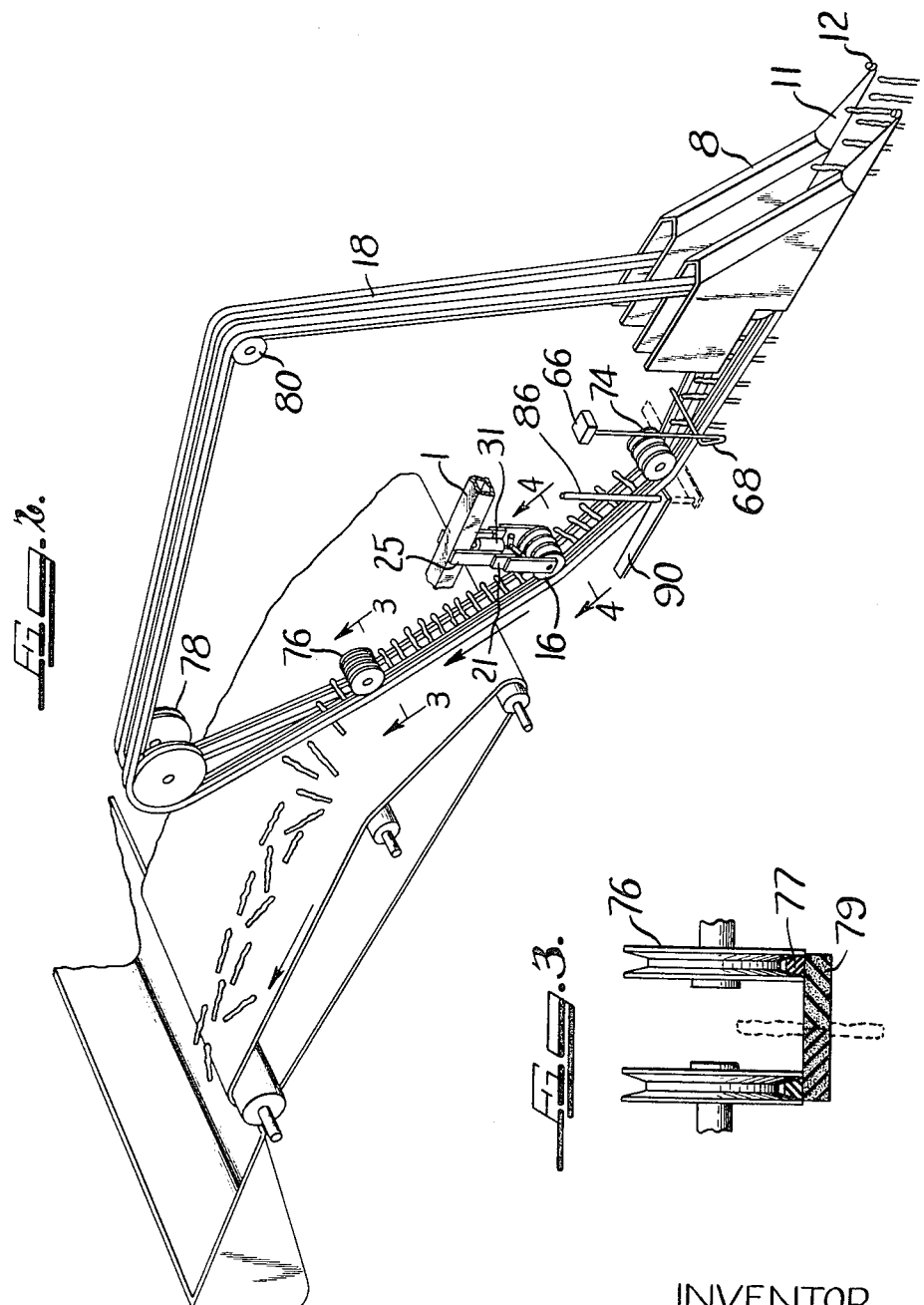

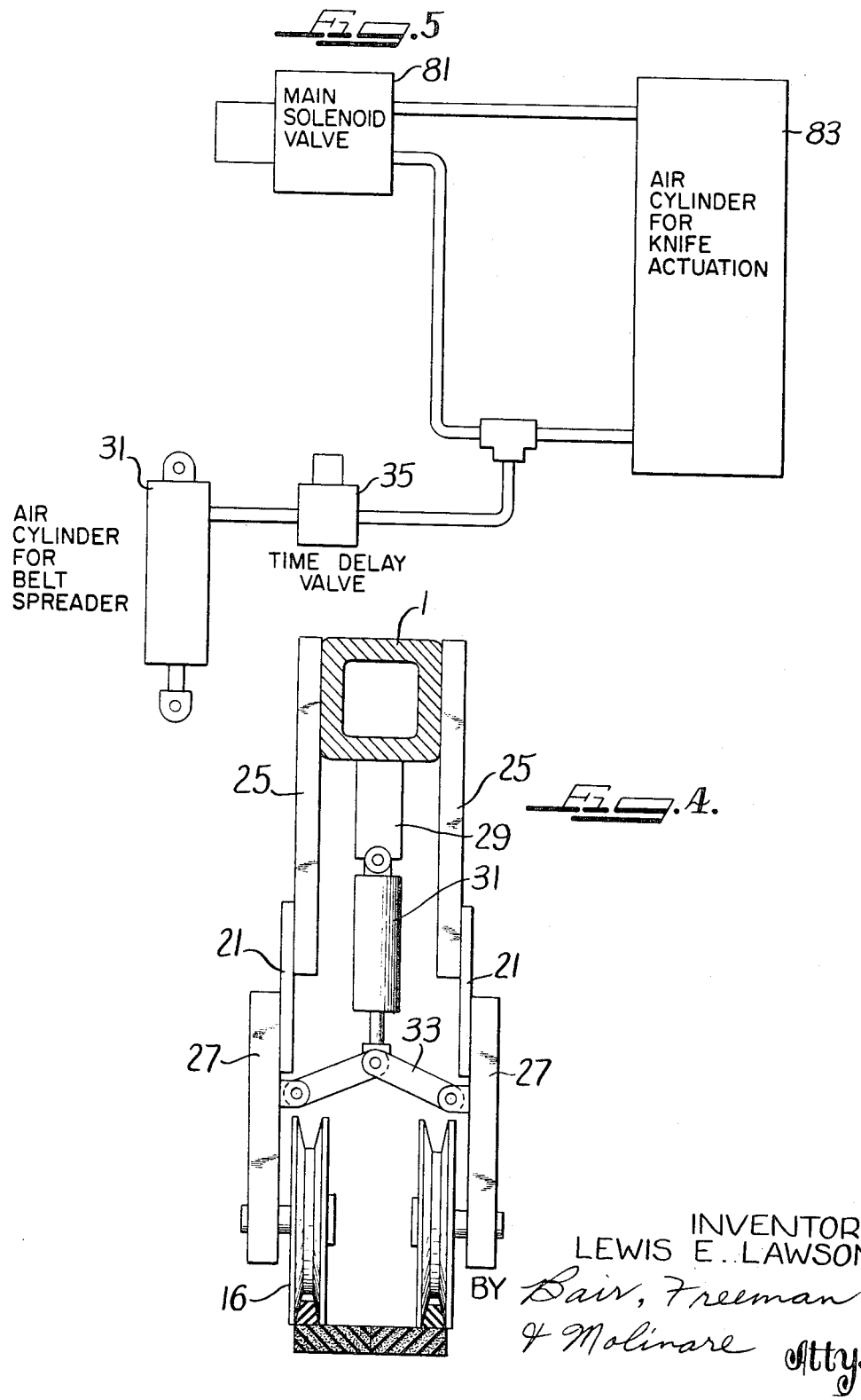

3,412,540
ASPARAGUS HARVESTER IMPROVEMENT
Lewis E. Lawson, Le Sueur, Minn., assignor to Green Giant Company, a corporation of Minnesota
Filed May 4, 1966, Ser. No. 547,488
6 Claims. (Cl. 56—327)

This invention relates to an means for spreading the pick-up belts on an asparagus harvester having endless belts which grip and hold asparagus spears, which means prevents damage to uncut spears during harvesting. In particular, the invention relates to a mechanical device for spreading the idler wheels which support endless belts on an asparagus harvester to thereby disengage short spears which are not to be cut.

There is disclosed in my copending application Ser. No. 521,021, filed Jan. 17, 1966, an asparagus harvester which comprises generally a support frame and driving mechanism, a leveling mechanism for adjusting the height of the harvester off the ground, a sensing device for sensing at a preselected height those asparagus spears which are to be cut, a pair of mating endless belts which hold the spears before, during and after cutting and transporting the cut spears to a storage hopper and finally a retractable cutting blade mechanism for severing the spears which are selected for harvesting.

In operation of the harvester as disclosed in my above-mentioned co-pending application, the endless belts grip and hold spears not only of the preselected height to be cut but also grip spears of lesser height which will not be cut but will be passed over for later harveting. The shorter spears are gripped between the pick-up belt which extend down sufficiently near to the ground to grasp the tops of the shorter spears. Unless such spear tops are released as the harvester moves over them, they will be damaged by tearing or mutilating as the belts continue to hold them and tend to pull them up from the ground. This is, of course, undesirable since it damages spears which are to be harvested at a later time and results ultimately in a spear of poor quality.

It is therefore an object of this invention to provide means to disengage the endless belts of an asparagus harvester from the top of spears which are sufficiently high to be held between the bottom of the belts but are not sufficiently high to be harvested, thereby to prevent damage to such spears by mutilation or breaking.

It is another object of this invention to provide means to spread the endless belts of an asparagus harvester when the cutting knife is in retracted position to permit any short spears held between the belts and not to be harvested to be released.

It is a further object of this invention to provide a time delay means for use in conjunction with the belt spreading device whereby the belts continue to grip cut spears after retraction of the knife for transporting of such spears to a storage area.

Other objects of this invention will become apparent as it is described more fully hereinafter.

In the drawings:

FIG. 1 is a side elevation showing one embodiment of an asparagus harvester useful with the invention;

FIG. 2 is a perspective view of one harvesting unit of the device shown in FIG. 1;

FIG. 3 is a view along line 3—3 of FIG. 2;

FIG. 4 is a view along line 4—4 of FIG. 2 showing the spreader device of the invention, and FIG. 5 is a circuit diagram showing the control means for the device of the invention.

One embodiment of an asparagus harvester with which the device of the present invention is useful is described as noted above in co-pending application Ser. No. 521,-021, filed Jan. 17, 1966. Such harvester is broadly shown in FIGS. 1 and 2 and will be described herein to the extent necessary to explain the environment in which the device of the present invention operates.

The apparatus consists of a frame shown generally at 1 which supports a plurality of individual harvester units arranged side by side to cover a full asparagus bed width. The prespective view shown in FIG. 2 illustrates one such unit which is preferably about four inches wide. It should be understood that the units may vary in width and the number of units will depend upon the bed width. The apparatus shown in FIG. 1 illustrates a harvester as it is seen on the right hand side of a tractor. A like unit may be placed on the left-hand side of the tractor so that two beds may be harvested simultaneously.

Each harvester unit, as described more fully hereinafter, consists of a pair of endless belts supported by a plurality of idler wheels which belts travel within the unit structure, a sensing and cutting means independently operable as later noted and a pair of dividers which separate the unit from its neighbor and divide and guide the spears to pass between respective belts.

Frame 1 is secured to the tractor through support arm 2 and link 3 to pivot arm 4 which pivots around point 5 as shown in FIG. 1. Support arm 2 is pivotally secured to the lower front of frame 1 at pivot point 6, and the frame is raised or lowered by pivot about point 6 as pivot arm 4 is moved back and forth by cylinder 58 as described in the aforementioned co-pending application. The rear of frame 1 is secured by suitable coupling means to the axle of the tractor 7 through bracket 9 and the frame is free to pivot around main drive shaft 32 as the fulcrum for up and down movement of pivot point 6.

At the forward lower end of frame 1 are a plurality of divider plates 8 which are secured to the frame through brackets 10 (FIG. 1). Pairs of divider plate 8 converge at their forward ends through cups 11 which are provided with rollers 12 to divide and separate the asparagus stalks as the apparatus moves through a bed. At the rear of frame 1 is hopper 14 into which the cut asparagus spears are dumped after cutting and conveying on conveyor belt 24.

Supported by frame 1 are a plurality of idler rollers 16, 74, 72, 70, 80 and 76 which support belts 18. Frame 1 also supports a blade actuator and cutter mechanism shown generally at 20 and described in detail in the aforementioned co-pending application. Frame 1 further supports idlers 22 and 23 which guide conveyor belt 24 for transporting the cut asparagus spears to hopper 14. A sensor mechanism shown generally at 26 includes a wire 68 (FIG. 2) which operates as described hereinafter. The harvester apparatus is powered by means of sprocket wheels and chains shown generally at 19 in FIG. 1 and described in detail in my abovementioned co-pending application. The drive means forms no part of the present invention and therefore is not described in detail herein.

The apparatus as shown in FIG. 1 also includes a leveling mechanism which contains the harvester at substantially constant height above the ground by means of a feeler runner 54 which contacts the ground along the outside edge of the outboard harvester unit on each side of the tractor. The details of operation of the leveling mechanism are fully described in the aforemention co-pending application and since they form no part of this invention, will not be described herein.

Each harvester unit as shown in FIG. 2 has its individual asparagus spear sensing device which is separately actuated and controlled as described in detail in my aforementioned co-pending application. Broadly speaking, the censor comprises a wire 68 which is displaced upon striking a spear of preselected height. Movement of wire 68 actuates a switch 66 (FIG. 2) which through suitable electrical and hydraulic means causes blade 90 to extend and rotate 90° across the path of the asparagus spears as shown in FIG. 2.

The belt transport system of the apparatus consists of a plurality of pairs of endless belts 18 which travel in parallel vertical planes in adjacent units. The belts are guided by idlers 16, 74, 72, 70, 80, 78 and 76 which cause the belts to alternately converge and diverge to grasp and support asparagus spears to be cut and later to drop the cut spears on conveyor belt 24. Because of the proximity of the belts to the soil surface, spears which are not tall enough to actuate the sensing means are gripped between the mating belt surfaces and may be damaged if not released as the harvester passes over them. It is this problem to which the instant invention is directed. The belts for adjacent units are housed at their forward ends between divider plates 8 as shown in FIG. 2 and are guided therebetween by idler rollers 70 and 72 (FIG. 1). As the belts approach idler wheel 74, they converge and remain converged as they pass over idlers 16 and 76. On passing idler 76, the belts diverge up over idler wheel 78 and remain diverged past wheels 80 and back down onto wheels 70 and 72.

The belts are made by fastening rubber strips 79 (FIG. 3) to the back of A section V belts 77 so that the internal edges of the foam contact one another when the belts are mounted in adjacent idler wheel. The foam rubber is sufficiently flexible to grip an asparagus spear passing between the belt without damaging the spear.

The cutter blade mechanism shown in FIG. 1 comprises a vertically-oriented hydraulic cylinder 83 secured to frame 1. Cylinder 83 is controlled by means of a main solenoid valve 81 (FIG. 5). Attached to the piston of cylinder 80 is a connecting shaft 86 with a knife blade 90 at the bottom. Knife blade 90 is raised and lowered by means of hydraulic cylinder 80 as shown in the embodiment of FIG. 1 or alternatively by means of an electrical device such as an electrical linear actuator. Such electrical linear actuators are available commercially and are operable on a 12-volt direct current power source. Such actuators are desirable for use with an apparatus as described herein since they provide for a more rapid action of the retraction and extension of the blade and eliminate the need for a pneumatic system with its compressors, lines, fittings, and controls.

Operation of the apparatus is fully described in the aforementioned co-pending application. Briefly, for purposes of background in this application, the harvester operates by moving along a row or bed of asparagus having some spears of sufficient height to be harvested. Belts 18 are caused to move at a peripheral speed equal to the machine's ground speed. As the machine progesses through the bed, rollers 12 guide the spears between divider plates 8 into respective units and between the pick-up belts. As the belts diverge, the spears are caused to lean toward the center of the lane. When sensing arm 68 reaches a spear of sufficient height, the arm is rotated 90° by contact with the spear, which rotation actuates a switch and other circuitry causing knife blade 90 to be lowered into position for cutting. The knife blade is maintained in cutting position during a predetermined time as controlled by a time delay device. During the time delay, the edge of the knife blade reaches and cuts the earlier sensed spear which is held upright between belts 18. The severed spear or spears remain hanging between the belts and are transported upwardly to a position above the conveyor where the belts diverge (rearward of idler wheel 76) and the spear is dropped butt end first onto conveyor belt 24. When the time interval of the time delay expires, the control mechanism shifts the knife back to the retracted position.

The belt spreading mechanism of this invention which is useful in conjunction with the above described harvester is shown in detail in FIGS. 4 and 5 and diagrammatically in FIG. 2. Referring to FIG. 4, the spreader device comprises support arms 25 which are secured to frame 1 by suitable bolts or welding. The device is used in conjunction with idler wheels 16 (FIGS. 1 and 2). Attached to the bottom of arms 25 are leaf springs 21 which extend downwardly and connect with brackets 27 to which are secured at their lower ends idler wheels 16.

Also attached to frame 1 between arms 25 is a support bracket 29 which carriers a small air cylinder 31. The piston of air cylinder 31 is attached to a toggle assembly 33, the ends of which are secured to brackets 27 as shown in FIG. 4. The piston in cylinder 31 is caused to move vertically up and down which results in horizontal spreading of extension members 27, idler wheels 16, and belts 18 supported by wheels 16. The stroke of the air cylinder piston is preferably about 5/8 inch for the embodiment shown in FIG. 4. Thus, it can be seen that the spreader device of FIG. 4 is operable to separate belts 18 upon signal to cylinder 31.

Referring to FIG. 5, air cylinder 31 is connected through a time delay valve 35 to the "retract" side of knife actuating cylinder 83. In normal operation, the knife rides in retracted position (FIG. 2) and therefore air is supplied to small cylinder 31 and idler wheels 16 are maintained in the spread condition. This insures that any short spears not to be harvested which are grasped during movement of belts 18 over an asparagus field are not retained between the belts as the machine moves down the field so as to injure the spears. That is, as such spears held by the belts approach idler wheels 16, the belts are spread and the spears released.

When a spear to be harvested is sensed, the knife and cylinder 83 are extended and this results in the retraction of air cylinder 31 and thus the bringing together if idler wheels 16. The time delay permits idlers 16 to remain in close position for a slightly longer interval than the knife remains in cutting position, so that a spear which has just been severed will be grasped and carried upward even though the knife has meanwhile returned to the retracted position. This is necessary, otherwise, cut spears would be prematurely dropped on the ground before reaching conveyor 24.

In the event an electrical linear actuator is used rather than hydraulic cylinder 83, small air cylinder 31 is replaced by a direct current solenoid, well known in the art and commercially available. In such event, time delay air valve 35 is replaced by an auxilliary switch in the principal time delay relay for controlling the main cylinder as described in the aforementioned co-pending application.

It can thus be seen from the above described invention that spears which are not yet at the preselected height to be cut, but which are high enough to be gripped between the horizontal portions of the endless belts 18 will not be injured as the belts progress through an asparagus field. Although such spears may be gripped, they will be released by the belt as the belt is spread by idler roller 16 upon movement of the harvester through an asparagus field.

I claim:

1. In an apparatus for harvesting asparagus comprising a wheeled frame movable along an asparagus field, sensing means to contact asparagus spears of at least a preselected height, cutting means for selective raising and lowering in response to signal from said sensing means, means for raising and lowering said cutting means, and means for holding and supporting said asparagus spears before and during cutting including pairs of endless belts with mating vertical edges, said edges consisting of a resilient material for holding and supporting said spears, the improvement in combination therewith comprising means for disengaging the mating vertical edges of said belts at preselected times to release spears of uncut asparagus stalks held therebetween.

2. The apparatus of claim 1 wherein said disengaging means consists of a pair of horizontally-movable idler wheels which support said belt, means for holding and supporting said wheels in a first preselected position wherein the vertical edges of said belts are in mating relation, and means to move said wheels to a second preselected position wherein said mating belt edges are disengaged.

3. Apparatus of claim 2 wherein the means to move said wheels to the second preselected position includes a vertically disposed air cylinder, and a toggle assembly secured to said air cylinder and supporting means for selectively moving said wheels between said first and second positions upon actuation of said air cylinder.

4. Apparatus of claim 2 wherein said means for holding and supporting said wheels includes a pair of vertically-disposed brackets resiliently secured to said wheeled frame for movement between said first and second preselected positions.

5. Apparatus of claim 2 wherein said means to move said wheel to the second preselected position includes an electrically-operated solenoid.

6. Apparatus of claim 3 further including time delay means for controlling said air cylinder in response to movement of said cutting means.

References Cited
UNITED STATES PATENTS

| | | | |
|---|---|---|---|
| 2,767,544 | 10/1956 | Turkington | 56—327 |
| 2,791,878 | 5/1957 | Kepner | 56—327 |
| 2,902,997 | 9/1959 | Hawkins et al. | 171—61 X |
| 3,066,469 | 12/1962 | Chatagnier | 56—327 |
| 3,176,456 | 4/1965 | Franzen | 56—327 |

ABRAHAM G. STONE, *Primary Examiner.*

P. A. RAZZANO. *Assistant Examiner.*